United States Patent [19]

Kurabayashi et al.

[11] Patent Number: 5,592,673
[45] Date of Patent: Jan. 7, 1997

[54] LOOSELY COUPLED COMPOUND COMPUTER SYSTEM USING LOCK AND SEMAPHORE MECHANISM FOR PERFORMING EXCLUSIVE CONTROL OF SHARED RESOURCE WHICH IS ACCESSED THROUGH A DISTINCT BUS

[75] Inventors: Hiroaki Kurabayashi; Shin-ichiro Mochizuki, both of Tokyo, Japan

[73] Assignee: Kabushiki Kaisha Toshiba, Kawasaki, Japan

[21] Appl. No.: 458,825

[22] Filed: Jun. 2, 1995

Related U.S. Application Data

[63] Continuation of Ser. No. 842,520, Feb. 27, 1992, abandoned.

[30] Foreign Application Priority Data

Feb. 27, 1991 [JP] Japan .................................. 3-032968

[51] Int. Cl.$^6$ ........................................... G06F 13/00
[52] U.S. Cl. ........................ 395/726; 395/728; 395/729; 395/200.14; 364/228.1; 364/228.8; 364/256.8
[58] Field of Search ...................... 395/726, 728, 395/729, 650, 725, 200.14

[56] References Cited

U.S. PATENT DOCUMENTS 4,189,771  2/1980  Roever ..................... 364/200
4,320,451  3/1982  Bachman et al. .......... 364/200
4,574,350  3/1986  Starr ......................... 364/200
5,016,162  3/1991  Epstein et al. ............. 364/200
5,050,072  9/1991  Earnshaw et al. ......... 364/200
5,170,481  12/1992  Begun et al. ............. 395/725

Primary Examiner—Thomas C. Lee
Assistant Examiner—Le Hien Luu
Attorney, Agent, or Firm—Oblon, Spivak, McClelland, Maier & Neustadt, P.C.

[57] ABSTRACT

Exclusive control using a semaphore mechanism of a specific computer is executed, and P and V operation instructions for the semaphore mechanism are issued according to a use request and use end information of a shared resource from another computer or the specific computer. Whether or not enabling information for the use request is informed to a use request source computer is determined according to the value of a semaphore variable. For this reason, even when a use of the shared resource is not enabled, enabling information is merely not sent back to another computer or the specific computer as the request source computer, and a lock server mechanism can be prevented from being set in an execution waiting state according to the unsuccessful P operation instruction.

5 Claims, 4 Drawing Sheets

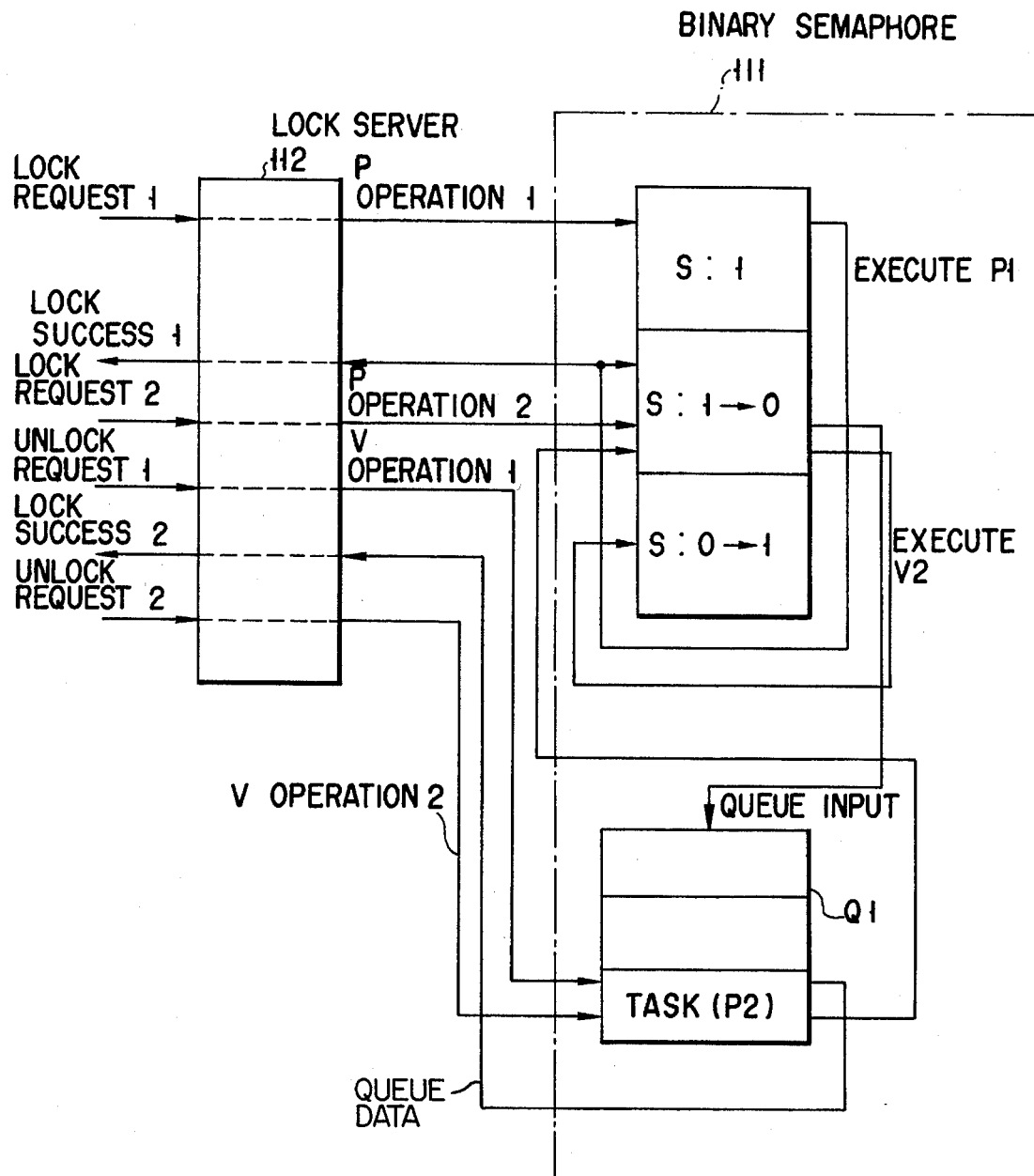
F I G. 2

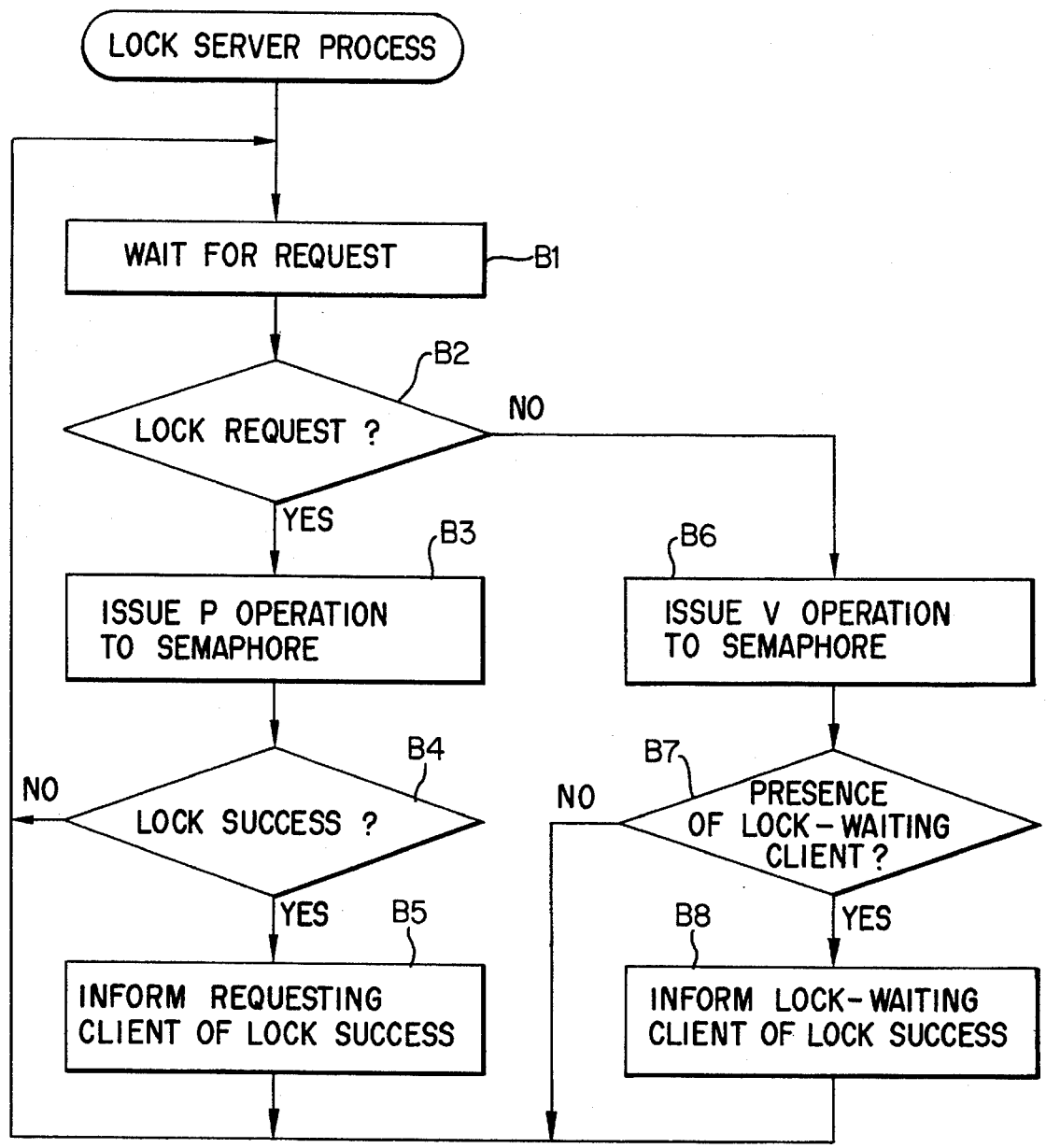
F I G. 4

LOOSELY COUPLED COMPOUND COMPUTER SYSTEM USING LOCK AND SEMAPHORE MECHANISM FOR PERFORMING EXCLUSIVE CONTROL OF SHARED RESOURCE WHICH IS ACCESSED THROUGH A DISTINCT BUS

This application is a Continuation of application Ser. No. 07/842,520, filed on Feb. 27, 1992, now abandoned.

BACKGROUND OF THE INVENTION

1. Field of the Invention

The present invention relates to a compound computer system and, more particularly, to a compound computer system constituted by connecting a plurality of computers, which use a shared resource under exclusive control.

2. Description of the Related Art

In general, in a computer, exclusive control utilizing a semaphore is performed as a synchronous control system executed when a plurality of tasks use a shared resource.

In particular, a binary semaphore, which limits the values to be assumed by a semaphore variable to "0" and "1", is effectively utilized as a technique for realizing a mutual exclusion system for allowing only one task to use a shared resource.

In the exclusive control based on the binary semaphore, a value "1" of the semaphore variable indicates a ready state of a shared resource, and a value "0" of the semaphore variable indicates a busy state of the shared resource. The value of the semaphore variable is increased/decreased in response to P and V operation instructions.

More specifically, a semaphore variable S is checked according to the P operation instruction. If the value of the semaphore variable is "1", the semaphore variable S is set to be "0" by a subtraction (S−1) of −1 from the semaphore variable S. On the other hand, if the value of the semaphore variable is "0", execution of the P operation instruction is interrupted, and a task is queued in a semaphore queue.

In response to the V operation instruction, it is checked if there are tasks that are waiting in a queue. If there are tasks, the first task is set in an execution enable state; otherwise, the semaphore variable S is set to be "1" by an addition (S+1) of +1 to the semaphore variable S.

The V operation instruction is used to inform that a given condition is met, and the P operation instruction is used for waiting until a condition is met. For example, when a specific task in a computer generates a use request to a shared resource, the P operation instruction is issued, and when the use of the shared resource by the specific task ends, the V operation instruction is issued.

However, since the binary semaphore is to perform exclusive control among a plurality of tasks in a single computer, it is difficult to grant exclusive control across a plurality of computers.

More specifically, a binary semaphore mechanism provided in each of a plurality of computers constituting a compound computer system can only perform exclusive control among tasks in the corresponding computer. Therefore, the mechanism cannot queue a task of another computer in its own semaphore queue, or cannot set a task of another computer in an execution enable state according to a V operation instruction.

A technique proposed for exclusive control among a plurality of computers using a semaphore of a specific computer is a technique for preparing a special-purpose task for performing P-V operations for a binary semaphore mechanism as an agent for a request/instruction from a task of another computer.

With this technique, however, the special-purpose task for performing P-V operations as an agent of another computer is operated parallel to a plurality of tasks in the specific computer. Therefore, the special-purpose task itself may be undesirably set in a wait state in a P operation instruction. When the special-purpose task as an agent is set in the wait state in this manner, processing for another computer, i.e., a request/information from another computer cannot be accepted.

The above-mentioned special-purpose task for performing P-V operations may be prepared in the semaphore mechanism of each computer. With this architecture, however, resources such as a CPU, a memory, and the like for task generation are wastefully used, and the performance of the compound computer system is deteriorated.

In this manner, in the conventional system, a special-purpose task must be prepared in a semaphore mechanism of each computer so as to reliably execute exclusive control across a plurality of computers, and computer resources are used in a wasteful manner.

SUMMARY OF THE INVENTION

The present invention has been made in consideration of the above situation, and has as its object to provide a compound computer system, which can reliably perform exclusive control among a plurality of computers without wasting computer resources.

According to the present invention, there is provided a compound computer system constituted by connecting a plurality of computers, which use a shared resource under exclusive control, wherein a specific computer of the plurality of computers comprises semaphore means for managing a busy state of the shared resource according to a value of a semaphore variable, which is increased/decreased in response to P and V operation instructions, and semaphore management means for issuing the P and V operation instructions in response to a use request and use end information of the shared resource from another computer or the specific computer, and determining whether or not enabling information to the use request is issued to a use request source computer according to the value of the semaphore variable, and each of the remaining computers comprises means for transmitting the use request and the use end information of the shared resource to the specific computer, and means for delaying a use of the shared resource until enabling information from the semaphore management means is received.

In this compound computer system, exclusive control using a semaphore mechanism of a specific computer is executed, and P and V operation instructions for the semaphore mechanism are issued according to a use request and use end information of a shared resource from another computer or the specific computer. Whether or not enabling information for a use request is to be informed to the use request source computer is determined according to the value of a semaphore variable. For this reason, when another computer or the specific computer is not enabled to use the shared resource in the P operation instruction, the enabling information is merely not sent back to the request source computer, and the semaphore management means can be prevented from being set in an execution wait state according to the unsuccessful P operation instruction. Therefore, the use request and the use end information of the shared resource from another computer or the specific computer can be accepted any time, and exclusive control across a plurality of computers can be reliably executed.

According to the present invention, since no special-purpose task for performing P-V operations as an agent of a request/instruction from a task of another computer is required, computer resources can be prevented from being wasted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a diagram for explaining the flow of signals between a semaphore mechanism and a lock server mechanism according to the embodiment shown in FIG. 1;

FIG. 4 is a flow chart for explaining an operation of a lock server according to the embodiment shown in FIG. 1.

DETAILED DESCRIPTION OF THE PREFERRED EMBODIMENTS

An embodiment of the present invention will be described below with reference to the accompanying drawings.

Figure 1:
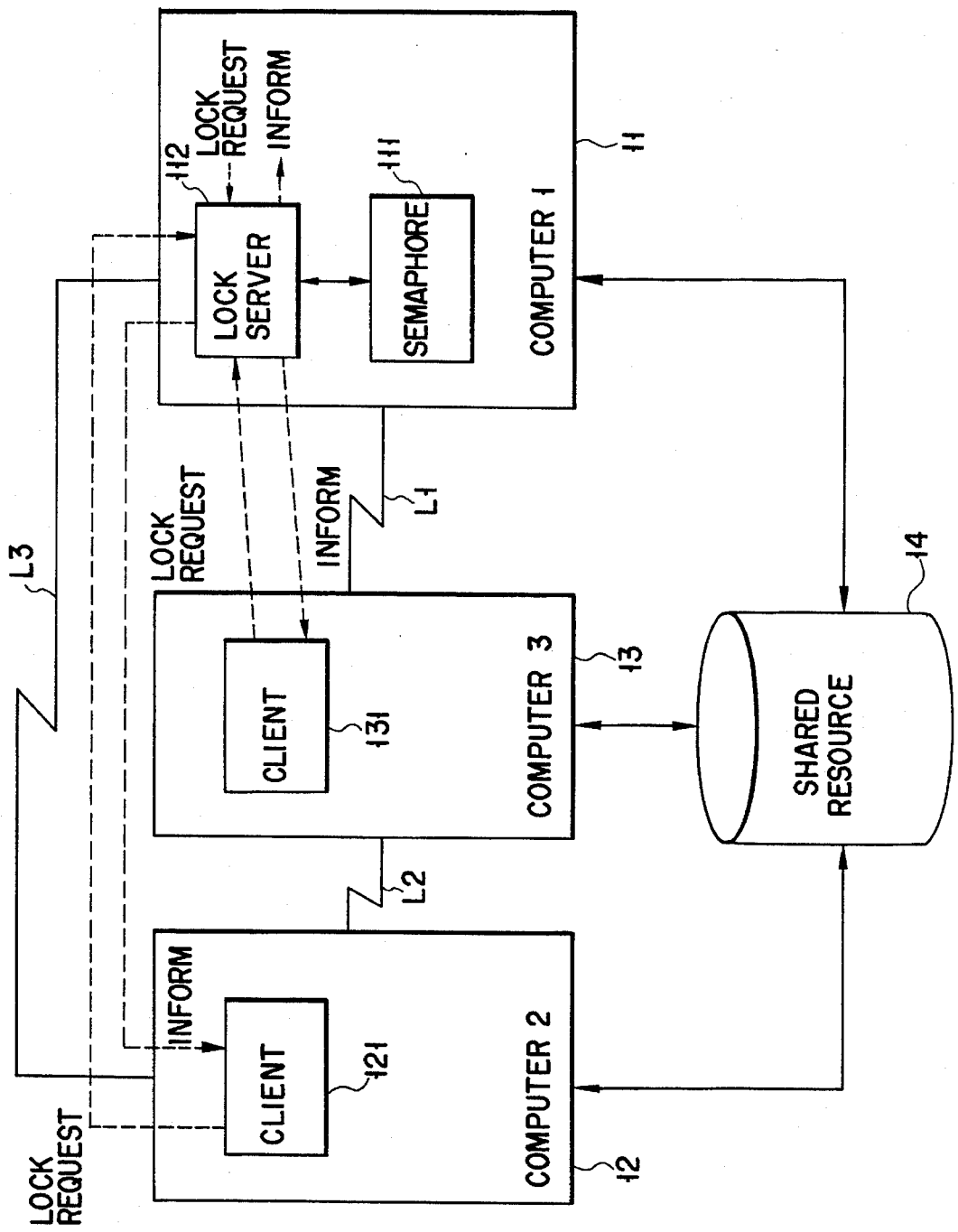
FIG. 1 is a block diagram showing a system arrangement according to an embodiment of the present invention.

FIG. 1 shows the system arrangement of a compound computer system according to an embodiment of the present invention. The compound computer system is constituted by connecting first through third computers 11 through 13 to each other. These computers 11 through 13 use a shared resource 14 including various memories, data files, and the like under the exclusive control.

The first computer 11 is connected to the third computer 13 through a communication line L1. The second computer 12 is connected to the third computer 13 through a communication line L2. Furthermore, the first and second computers 11 and 12 are connected via a communication line L3.

The first through third computers 11 through 13 basically have the same data processing function. The first computer 11 is provided with a semaphore mechanism 111 and a lock server mechanism 112 so as to exclusively use the shared resource 14 among the first through third computers 11 through 13.

The second and third computers 12 and 13 are respectively provided with client mechanisms 121 and 131 for requesting to allow a use of the shared resource 14 to the first computer 11.

The semaphore mechanism 111 realizes a binary semaphore, which limits values to be assumed by a semaphore variable to "0" and "1", and manages the presence/absence of a busy state of the shared resource 14.

The lock server mechanism 112 looks up the semaphore variable of the semaphore mechanism 111 to manage execution of exclusive control among the computers 11 through 13, and issues P and V operation instructions in response to a use request and use end information from a client (not shown) in the computer 11 or the client mechanisms 121 and 131 in the computers 12 and 13.

When the semaphore variable is "1" upon execution of a P operation instruction, the lock server mechanism 112 informs use enabling information of the shared resource 14 to a use request source computer; when the semaphore variable is "0", it does not issue enabling information. Furthermore, when a task is waiting in a queue of the semaphore mechanism 111 upon execution of the v operation instruction, the lock server mechanism 112 issues use enabling information to a computer corresponding to the task which is waiting.

Each of the client mechanisms 121 and 131 issues a use request to the lock server mechanism 112 when the use request to the shared resource 14 is generated, and issues use end information to the lock server mechanism 112 when the use of the shared resource 14 is ended.

Upon reception of the use enabling information for the use request from the lock server mechanism 112, each of the client mechanisms 121 and 131 starts the use of the shared resource, and is set in a wait state until it receives the use enabling information.

The flow of signals between the semaphore mechanism 111 and the lock server mechanism 112 will be described below with reference to FIGS. 1 and 2.

When a use request (lock request 1) of the shared resource 14 from the second computer 12 is sent to the lock server mechanism 112 through the communication line L3, the lock server mechanism 112 issues a P operation instruction 1, and checks the semaphore variable S of the semaphore mechanism 111. At this time, if the semaphore variable S is "1", the P operation instruction is executed, and the semaphore variable S is set to be "0" upon subtraction of (S−1). In addition, the lock server mechanism 112 issues use enabling information (lock success information 1) to the computer 12 through the communication line L3.

Thereafter, when the use request (lock request 2) for the shared resource 14 from the third computer 13 is sent to the lock server mechanism 112 through the communication line L1, since the value of the semaphore variable S is "0" at this time, the P operation instruction 2 is not executed, and the use request task is input to a queue Q1 of the semaphore mechanism. In this case, the lock server mechanism 112 issues no use enabling information to the third computer 13.

When information (unlock request 1) indicating the end of use of the shared resource 14 is sent from the second computer 12 to the lock server mechanism 112 through the communication line L1, the lock server mechanism 112 issues a V operation instruction 1 to check the presence/absence of a task in the queue Q1. If the lock server mechanism 112 finds a task, it issues use enabling information (lock success information 2) to the computer 13 corresponding to the task.

When information (unlock request 2) indicating the end of use of the shared resource 14 is sent from the third computer 13 to the lock server mechanism 112 through the communication line L1, the lock server mechanism 112 issues a V operation instruction 2. However, in this case, since there is no task in the queue Q1, an addition (S+1) is performed to set the semaphore variable S to be "1".

Figure 3:
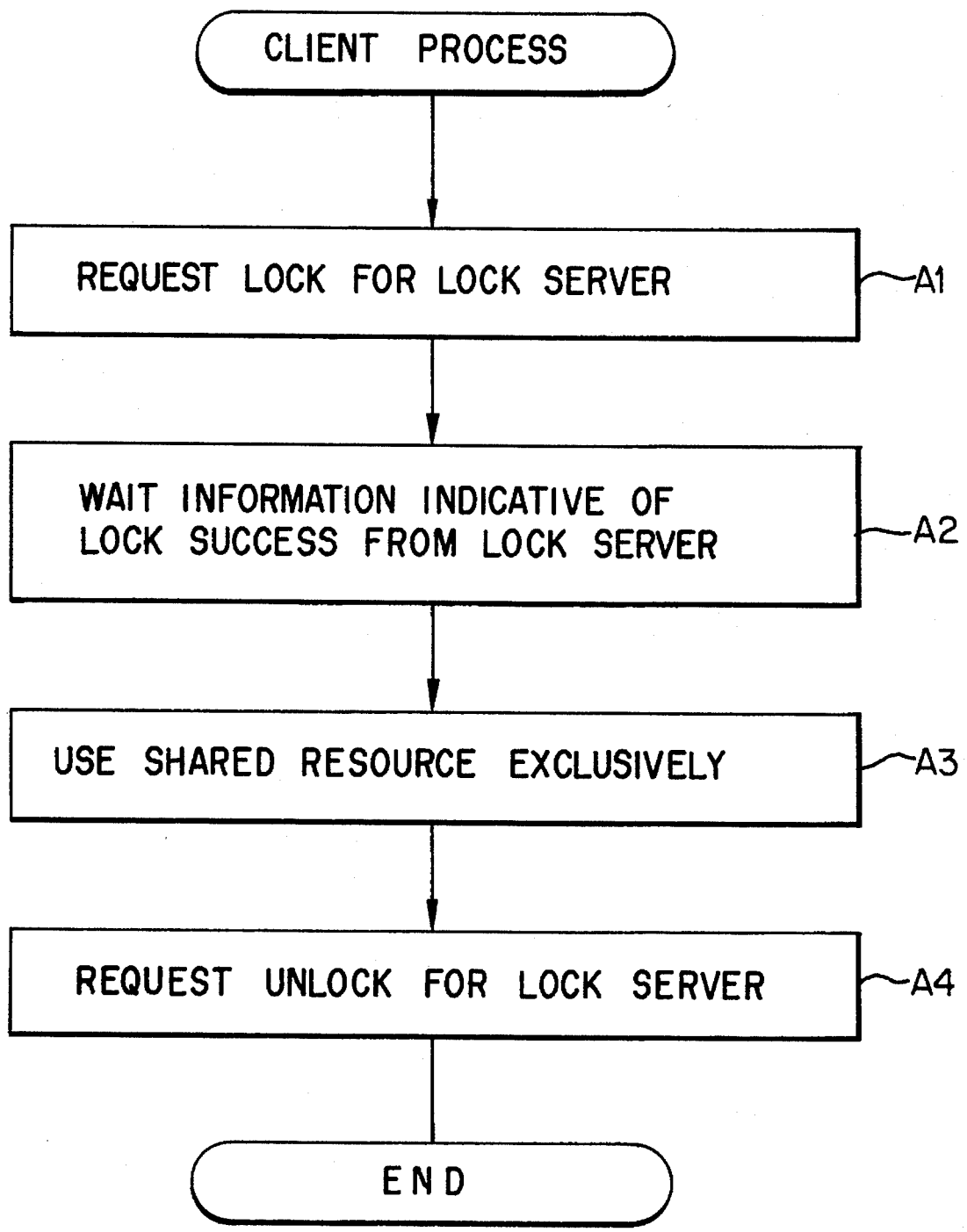
FIG. 3 is a flow chart for explaining an operation of a client task according to the embodiment shown in FIG. 1.

FIG. 3 is a flow chart showing the operation sequence of the client mechanisms 121 and 131, and FIG. 4 is a flow chart showing the operation sequence of the lock server mechanism 112.

The exclusive control operation of the overall compound computer system shown in FIG. 1 will be described below with reference to these flow charts of FIGS. 3 and 4.

The client mechanisms 121 and 131 of the computers 12 and 13 issue lock requests (LOCK REQUEST 1, LOCK REQUEST 2) to the lock server mechanism 112 of the computer 11 (step A1). The client mechanisms 121 and 131 are set in a wait state until enabling information (lock success information) is sent back from the lock server mechanism 112 (step A2).

When the lock request (LOCK REQUEST 1) from the client mechanism 121 arrives the lock server mechanism 112 earlier, the lock server mechanism 112 performs a (P OPERATION 1) for the semaphore mechanism 111 (steps B1 through B3). At this time, the lock server mechanism 112 issues a P instruction added with computer identification data and task identification data indicating which task of which computer issued the lock request (P OPERATION 1) to the semaphore mechanism 111.

When the shared resource 14 is ready, the P operation is successful, and the lock server mechanism 112 issues lock success information (use enabling information) (LOCK SUCCESS 1) to the client mechanism 121 (steps B4 and B5).

In response to the lock success information (LOCK SUCCESS 1), the client mechanism 121 of the computer 12 exclusively uses the shared resource 14 (step A3).

When the lock request (LOCK REQUEST 2) from the client mechanism 131 of the computer 13 arrives the lock server mechanism 112 while the client mechanism is exclusively using the shared memory 14, the lock server mechanism 112 performs a P operation (P OPERATION 2) for the semaphore mechanism 111 (steps B1 through B3). However, since the shared resource 14 is busy at this time, the P operation is unsuccessful, and the lock server mechanism 112 does not issue lock success information (use enabling information) to the client mechanism 121 (step B4).

Thus, the client mechanism 131 of the computer 13 is kept in the wait state (step A2).

Thereafter, when the client mechanism 121 of the computer 12 ends the use of the shared resource 14, a release request (unlock request) (UNLOCK REQUEST 1) of the shared resource 14 is sent to the lock server mechanism 112 (step A4).

When the unlock request (UNLOCK REQUEST 1) from the client mechanism 121 arrives the lock server mechanism 112, the lock server mechanism 112 performs a V operation for the semaphore mechanism 111 (steps B1, B2, and B6). At this time, the lock server mechanism 112 issues a V instruction (V OPERATION 1) added with computer identification data and task identification data indicating which task of which computer issued the unlock request to the semaphore mechanism 111.

In this V operation, since the client mechanism 131 of the computer 13 waits for lock success information, information in the queue QUEUE DATA is sent back from the semaphore mechanism 111 to the lock server mechanism 112, and the lock server mechanism 112 issues lock success (LOCK SUCCESS 2) information to the client mechanism 131 according to the returned information (steps B7 and B8).

In response to the lock success information, the client mechanism 131 of the computer 13 exclusively uses the shared resource 14 (step A3).

When the client mechanism 131 of the computer 13 ends the use of the shared resource 14, a release request (unlock request) (UNLOCK REQUEST 2) of the shared resource 14 is sent to the lock sever mechanism 112 (step A4).

When the unlock request from the client mechanism 131 arrives the lock server mechanism 112, the lock server mechanism 112 performs a V operation (V OPERATION 2) for the semaphore mechanism 111 (steps B1, B2, and B6).

In this V operation, since there is no lock waiting task, the semaphore variable is changed from "0" to "1".

As described above, in this embodiment, exclusive control using only the semaphore mechanism 111 of the computer 11 is executed, and the P and V operation instructions for the semaphore mechanism are issued according to a use request and use end information of the shared resource from another computer 12 or 13, or the computer 11. Whether or not enabling information for the use request is informed to a use request source computer is determined according to the value of the semaphore variable.

For this reason, even when the use of the shared resource 14 is not enabled, enabling information is merely not sent back to another computer 12 or 13, or the specific computer 11 as the request source computer, and the lock server mechanism 112 can be prevented from being set in an execution wait state according to the unsuccessful P operation instruction.

Therefore, the lock server mechanism can always accept the use request and use end information of the shared resource 14 from another computer 12 or 13, or the specific computer 11. Thus, exclusive control across a plurality of computers can be reliably performed.

In this embodiment, a case wherein a binary semaphore is utilized for mutual exclusion has been exemplified. However, if a count semaphore is used in place of the binary semaphore, the use of the shared resource can be simultaneously enabled for an arbitrary number of tasks in place of a single task.

When the same function as that of the client mechanisms 121 and 131 of the computers 12 and 13 is provided to a task (client) of the computer 11, exclusive control among all the computers 11 through 13 can be realized by the semaphore mechanism 111 and the lock server mechanism 112 in addition to that between the computers 11 and 12, as a matter of course.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A loosely-coupled compound computer system constituted by connecting a plurality of computers through a network, said plurality of computers using a shared resource under exclusive control, each of the plurality of computers being connected to said shared resource through a distinct bus and wherein a specific computer of said plurality of computers comprises:

semaphore means for indicating a busy state of said shared resource according to a value of a semaphore variable which is increased/decreased in response to P and V operation instructions; and means, coupling to said semaphore means, for issuing the P and V operation instructions added with computer identification data and task identification data indicating which task of which computer issued a use request or use end information of the shared resource through the network in response to a shared resource use request from another computer or the specific computer, and determining whether or not enabling information of the use request should be issued through the network to a source computer of the use request according to the value of the semaphore variable, and each remaining computer of said plurality of computers comprises:

means for transmitting the shared-resource-use request to the issuing means in the specific computer through the network;

means for receiving the enabling information representing permission of the use request to access the shared resource from the issuing means in the specific computer through the network and then accessing the shared resource through the distinct bus;

means for waiting to use said shared resource until the enabling information from said semaphore means is received through the network; and means for issuing, to the issuing means in the specific computer through the network, the use end information upon completion of the access to said shared resource, whereby the semaphore means releases the busy state of the shared resource.

2. A system according to claim 1, wherein said semaphore means comprises a binary semaphore.

3. A system according to claim 1, wherein said semaphore means comprises a count semaphore.

4. A system according to claim 1, wherein said semaphore means comprises means for, when the semaphore variable is "0", queuing the computer identification data indicating the computer as the use request source, and the task identification data in a queue.

5. A method of performing exclusive control utilizing a semaphore in a loosely-coupled compound computer system constituted by connecting a plurality of computers through a network, said plurality of computers using a shared resource under exclusive control, each of said plurality of computers being connected to the shared resource through a distinct bus, a specific computer of said plurality of computers comprising a semaphore mechanism for indicating a busy state of said shared resource according to a value of a semaphore variable which is increased/decreased in response to P and V operation instructions, and a lock server mechanism for looking up the semaphore variable of said semaphore mechanism to manage the exclusive control among said plurality of computers, comprising the steps of:

a) issuing a lock request to said lock server mechanism through the network;

b) causing said lock server mechanism to issue a P operation instruction added with computer identification data and task identification data indicating which task of which computer issued the lock request to said semaphore mechanism through the network;

c) causing said semaphore mechanism to check the value of the semaphore variable in response to the P operation instruction so as to determine whether said shared resource is ready or busy;

d) issuing use enabling information, representing an access permission for the shared resource, to a use request source through said lock server mechanism and through the network when the shared resource is ready;

e) queuing the computer identification data and the task identification data in a queue when the shared resource is busy; whereby a computer which issued the lock request waits to use said shared resource until the computer which issued the lock request receives use enabling information through the network; and f) accessing the shared resource through the distinct bus upon receiving the enabling information from the lock server mechanism.

* * * * *